United States Patent [19]

Jackson et al.

[11] Patent Number: 5,709,946
[45] Date of Patent: Jan. 20, 1998

[54] CHLORINE-FREE, ZERO VOC, WATERBORNE ADHESION PROMOTER FOR POLYOLEFINIC SUBSTRATES

[75] Inventors: Michael L. Jackson, LaGrange, Ill.; Frank A. Stubbs, Schererville; Joseph M. Mecozzi, Hammond, both of Ind.; David J. Miklos, Berwyn; Alexander L. Neymark, Chicago, both of Ill.

[73] Assignee: Bee Chemical Company, Lansing, Ill.

[21] Appl. No.: 381,810

[22] Filed: Feb. 1, 1995

[51] Int. Cl.$^6$ .................. B32B 27/38; B32B 27/08
[52] U.S. Cl. .................. 428/413; 428/414; 428/515; 428/516; 523/439; 525/117
[58] Field of Search ................. 428/414, 413, 428/516, 515; 523/439; 525/117

[56] References Cited

U.S. PATENT DOCUMENTS

| | | | |
|---|---|---|---|
| 3,326,856 | 6/1967 | Barie, Jr. et al. | 525/533 |
| 3,433,777 | 3/1969 | Brunson | 525/285 |
| 3,637,579 | 1/1972 | Barie, Jr. et al. | 428/416 |
| 4,507,411 | 3/1985 | Gordon et al. | 523/436 |
| 4,612,349 | 9/1986 | Nicco et al. | 525/117 |
| 4,657,781 | 4/1987 | Nicco et al. | 427/112 |
| 4,720,516 | 1/1988 | Kishida et al. | 523/436 |
| 5,037,885 | 8/1991 | Mori et al. | 525/65 |
| 5,288,780 | 2/1994 | Jarzombek et al. | 524/127 |
| 5,362,788 | 11/1994 | Kimura et al. | 524/377 |

FOREIGN PATENT DOCUMENTS

| 2131439 | 6/1984 | United Kingdom. |
|---|---|---|

OTHER PUBLICATIONS

Abstract, Nitto Electric Ind KK, J62259832–A OU. 12, 1987 87-338259/51.

*Primary Examiner*—Leszek Kiliman
*Attorney, Agent, or Firm*—Robert M. Didrick; Gerald K. White

[57] ABSTRACT

A zero VOC aqueous coating composition comprising a halogen-free propylene/$\alpha$-olefin copolymer having an $\alpha,\beta$-unsaturated dicarboxylic acid or anhydride grafted thereon, a base, and a water-dispersible resin containing at least two epoxy groups is applied to a plastic substrate comprising a propylene polymer. The dried coating promotes adhesion of a subsequent coating to the polypropylene-based surface of the article.

18 Claims, No Drawings

CHLORINE-FREE, ZERO VOC, WATERBORNE ADHESION PROMOTER FOR POLYOLEFINIC SUBSTRATES

BACKGROUND OF THE INVENTION

This invention relates to an adhesion-promoting thermoset coating for plastic substrates comprised of polyolefinic polymers. Because of their low surface energy and non-polar nature, such polymers are very difficult to paint with decorative and/or protective coatings. More particularly it relates to adhesion-promoting coatings which are halogen-free. Even more particularly, it relates to an aqueous coating composition having zero VOC (volatile organic compound-free) which improves the adherence of such a polyolefinic article to subsequent coatings when the adhesion-promoting composition is applied to the surface and cured by baking it at an elevated temperature.

The use of polyolefins such as polypropylene and polypropylene containing compounds modified with rubber called thermoplastic olefins (TPO) has grown significantly in areas such as the automotive market since the 1970's because of their low cost, low weight, impact resistance, ease of molding and recyclability. They have been used in interior applications such as airbag covers and exterior ones such as fascia and trim.

The isotactic crystalline structure of polypropylene gives it a low surface energy of anywhere from 20 to 30 dynes/cm, resulting in a surface that most coatings will not wet out or adhere to. This surface must be physically or chemically altered to render it paintable with available coating technology. Plasma treatment and corona discharge employ ionized gases to oxidize the surface of the polypropylene or TPO which raises its surface energy and allows it to chemically and mechanically bond with the coating. However, the surface remains temporarily oxidized and must be coated before the energy lowers again. This process can be difficult and expensive in a production environment when complexly shaped automotive parts are involved. Flame treatment will also oxidize the surface but this requires a precise distance of flame to surface which is again hard to control on a production line that is coating components of different shapes and sizes. TCE (1,1,1 trichloroethane) is used to etch or dissolve the surface of the propylene or TPO but due to volatile organic compound (VOC) and toxicity concerns, this method is being phased out. A more common approach to the painting of polypropylene and TPO is the use of an adhesion promoting primer coating that uses a chlorinated polyolefin resin to gain adhesion to the surface. These coatings are easy to process in a production environment and can be topcoated after a short ambient flash or bake. However, solvent borne chlorinated polyolefin resins have limited solubility and are mainly compatible only with aromatic solvents such as xylene or toluene and must be sprayed at V.O.C.'s of 5.7 pounds per gallon or higher to properly coat the surface of the polypropylene or TPO. This can be a problem for a finisher that is required to comply with strict federal and state emissions standards.

Aqueous dispersions of chlorinated polyolefin resins have been formulated into adhesion promoter coatings with V.O.C.'s ranging from 1.0 to 0 pounds per gallon but the high cost of these materials has been a hindrance to their acceptance in the marketplace, despite the lower V.O.C.'s. The presence of chlorine in these aqueous adhesion promoting compositions is still an environmental concern.

SUMMARY OF THE INVENTION

It is an object of this invention, therefore, to provide a non-halogenated thermoset adhesion promoting coating for polypropylene-based substrates.

It is a related object of this invention to provide a zero VOC coating composition containing a non-halogenated resin which promotes adhesion of a subsequent coating to a polypropylene-based substrate.

It is a related object of this invention to provide an article having a polypropylene-based surface which is coated with a zero VOC coating composition containing a non-halogenated resin which promotes adhesion of a subsequent coating to the surface.

It is a related object of this invention to provide an article having a polypropylene-based surface which is coated with an aqueous, zero VOC coating composition containing a non-halogenated resin which, when dry, promotes adhesion of a subsequent coating to the surface.

It is a related object of this invention to provide a polypropylene-based article having a coating which promotes adhesion of a subsequent coating in conditions of high humidity and when in contact with gasoline.

These and other objects which will become apparent from the following description thereof are provided by an article having a polyolefin resin surface which is coated with an aqueous composition comprising:

(a) a halogen-free copolymer of a higher $\alpha$-olefin and at least one monomer selected from the group consisting of ethylene and propylene, said copolymer having an $\alpha,\beta$-unsaturated dicarboxylic acid or anhydride grafted thereon;

(b) a base; and (c) a water-dispersible resin containing at least two epoxy groups.

Other polymers, including acrylics, polyurethanes, and melamines, to name a few, can be blended with the above mentioned composition. These resins are used to improve the physical properties of the system. In addition, pigments and additives can be employed to provide desired aesthetic or functional effects. The polyolefin surface may be that of an article made from a polyolefin or it may be that of a film on an article made from another material. The articles of particular interest for the purposes of this invention are polypropylene-based automotive parts that may be exposed to high humidity and may be subject to repeated contact with gasoline.

DETAILED DESCRIPTION OF THE INVENTION

The olefin copolymer of component (a) in the aqueous coating composition of the invention is a random copolymer or block copolymer of the ethylene and/or propylene with a higher $\alpha$-olefin. Propylene/$\alpha$-olefin copolymers suitable for use in this invention are available from Eastman Chemical Products, Inc. and from the Rexene Company. Ethylene/$\alpha$-olefin copolymers suitable for use in this invention are available from Union Carbide under the trademark FLEXIMERS. They are exemplified by ethylene/butene, ethylene/hexene, and ethylene/butene/hexene copolymers. A random copolymer of a higher $\alpha$-olefin and propylene is preferred and the proportion of the propylene component is preferably not less than 10 weight percent. If it is less than 10 weight %, then adhesion to polypropylene is poorer, which is, of course, undesirable. Examples of the higher $\alpha$-olefins include, butene-1, pentene-1, and hexene-1. Among these, hexene-1 is preferable from the standpoint of physical properties of the polymer. Hexene-1 levels may range from 10 to 80 wt % but a preferable level is approximately 60 weight percent of the propylene/$\alpha$-olefin copolymer composition. Mixtures of two or more of the higher α-olefins may be copolymerized with ethylene or propylene or with a mixture of ethylene and propylene.

The α,β-unsaturated dicarboxylic acids or their acid anhydrides to be graft copolymerized onto the propylene/α-olefin copolymer are exemplified by maleic acid, fumaric acid, itaconic acid, citraconic acid, allylsuccinic acid, mesaconic acid and aconitic acid, and their acid anhydrides. The amount of α,β-unsaturated dicarboxylic acid or its acid anhydride is preferably from about 1 to about 20% by weight of the grafted copolymer. If under 1% by weight, the stability of dispersion in water will become poor and, if over 20% by weight, the grafting efficiency decreases, which is uneconomical. From about 2 to about 10% by weight is particularly preferable and from about 4 to about 7% is even more preferable.

The number average molecular weight (determined by gel permeation chromatography or GPC) of the olefin copolymer after being grafted with the α,β-unsaturated dicarboxylic acid or its acid anhydride is preferably 3000 to 55,000. If under 3000, adhesion to the polyolefinic resin will be poorer and, if over 55,000, dispersion into water becomes difficult because of high viscosity. Bringing the molecular weight into this range is possible by selecting the molecular weight of the raw copolymer material or the conditions at the time of conducting the grafting reaction. Also, the grafting reaction may be conducted after the molecular weight of the raw copolymer material has been reduced.

Graft copolymerization of a α,β-unsaturated dicarboxylic acid or its acid anhydride onto the olefin copolymer may be conducted by a known method wherein the olefin copolymer is liquified by heating it above its melting point and the graft copolymerization is conducted in the presence of a free radical-generating agent. The product is referred to hereinafter as an acid grafted olefin copolymer.

When using this method, a reactor equipped with an intensive agitator, Banbury mixer, kneader, extruder or the like is employed and α,β-unsaturated dicarboxylic acid or its acid anhydride and a radical-generating agent or solution thereof in low boiling solvent are added at a temperature of not lower than about 150° C. to not higher than about 300° C. to react, and the product is pelletized by known methods after the low boiling solvent is removed.

It is also possible to dissolve the olefin copolymer in an organic solvent such as xylene under heat and conduct the reaction in the presence of a free radical-generating agent, but this method is less preferred because it is time-consuming to remove the organic solvent and the removal is not always complete.

The radical-generating agent to be used for the reaction can be appropriately selected from known materials, but an organic peroxide is particularly preferable. As the organic peroxides, for example, benzoyl peroxide, dicumyl peroxide, lauroyl peroxide, 2,5-dimethyl-2, 5-di(t-butylperoxy) hexane, di-t-butyl peroxide, t-butyl hydroperoxide, t-butyl peroxybenzoate and cumene hydroperoxide can be used, depending on the reaction temperature.

The dispersion of components (a) and (b) in water can be performed by a method wherein component (a) is liquified by heating it to a temperature above its melting point, and the base (b), water and a surfactant, if needed, are added to the acid grafted copolymer with agitation. According to another embodiment of the method, a mixture of (a),(b), and, if needed, a surfactant, is added to water or all of the components including water are mixed and agitated under heat. A dispersion with good stability can be obtained at high temperature and pressures above atmospheric.

As noted, dispersion is possible either with or without using a surfactant, but it is desirable to use a surfactant when the amount of α,β-unsaturated dicarboxylic acid or its acid anhydride having been graft copolymerized is low. The use level is preferably not more than 25% by weight of component (a). If over 25% the water resistance of paint film will become poor.

Any type of surfactant can be used, but nonionic surfactants are desirable because of their low toxicity. Combinations of non-ionic surfactants, anionic surfactants and fluorosurfactants (if halogen-containing components can be tolerated in small amounts) in which the non-ionic is the main component may be used.

Polyoxyethylene alkyl esters, polyoxyethylene alkyl ethers, polyoxyethylene alkylphenyl ethers, sorbitan alkyl esters, and polyglycerine esters are examples of the nonionic surfactants. A high molecular weight PLURONIC surfactant can be used.

Carboxylates, sulfonates, and phosphates are examples of the anionic surfactants. The fluorosurfactants may be anionic, nonionic or cationic.

Component (a) is neutralized with base in order to achieve good dispersion into water. Sodium hydroxide, potassium hydroxide, ammonia, methylamine, ethylamine, propylamine, butylamine, hexylamine, octylamine, ethanolamine, propanolamine, diethanolamine, N-methyldiethanolamine, dimethylamine, diethylamine, triethylamine, N,N-dimethylethanolamine, 2-dimethylamino-2-methyl-1-propanol, 2-amino-2-methyl-1-propanol and morpholine are examples of bases that may be used. The use of organic amines is suitable only when the introduction of small amounts of VOC must be tolerated in order to achieve other desirable properties.

Since the degree of hydrophilicity of the resin differs depending on the types of base being used, it is necessary to select one appropriate to the conditions. Amines having a hydroxyl group such as ethanolamine and 2-amino-2-methyl-1-propanol are preferable when their strong hydrophilicity is desired. Ammonia is preferable when the elimination of VOC from the paint system is of prime importance. The amount of base used is suitably in a range of 0.3 to 1.5 times as much as the equivalent weight to carboxyl group of component (a) and 0.5 to 1.2 times are preferable.

A preferred composition of the invention includes as the resin portion a maleated olefin copolymer crosslinked with at least one of the group consisting of a water-dispersible cycloaliphatic di-epoxy resin and a water-dispersible di-epoxy resin from the condensation of a bisphenol with epichlorohydrin.

Two different types of catalyst may be used to accelerate the curing of the mixture of di-epoxy resin and acid grafted olefin copolymer. In one system an acid catalyst is used with a di-epoxy resin emulsion. Although different epoxies can be used, a cycloaliphatic di-epoxy is preferred. The epoxy should be used at levels so that enough crosslinking of the acid grafted propylene/α-olefin copolymer occurs to assure complete integrity at high humidity but not at excessive levels so that adhesion to the substrate is prevented or interference with the crosslinking mechanism of the top coat applied over the coating of this invention occurs. The epoxy levels can range from approximately 50% to 600%, but preferably 200%, of the level of the acid grafted propylene/α-olefin copolymer based on the theoretical equivalent weights of the two resins. These levels represent, by weight, approximately 12% to 75%, but preferably 25% of the level of a maleated propylene/α-olefin copolymer when the di-epoxy resin has an equivalent weight of approximately 135. The acid catalyst, preferably a para-toluene sulfonic acid (PTSA) type, is used at levels of 2–4 weight percent of the combined weight of the acid grafted olefin copolymer and epoxy resins.

A second system involves using an di-epoxy resin, preferably a bisphenol A/epichlorohydrin type, and tertiary amine catalyst. The epoxy and catalyst levels used are similar to the levels used for the acid catalyzed system described above. The curing temperature may be as low as about 25° C. when the amine is used and it may be as high as about 150° C. when the curing catalyst is an acid.

The epoxy-crosslinked, acid grafted olefin copolymer of this invention comprises from about 40 to about 90 weight percent of the non-aqueous resin portion of the invention.

Various other resins are used in conjunction with the acid grafted olefin copolymer/epoxy resin/catalyst containing systems. Their main purpose is to improve the physical properties, such as hardness, of the coating of this invention. Acrylic emulsions and polyurethane emulsions are used at levels of from 0 to 100 weight percent, preferably about 50 weight percent, of the acid grafted olefin copolymer, on a solids basis. In addition to improving hardness, melamine resins can be used to further crosslink the epoxy crosslinked/acid grafted olefin copolymer coating. The melamine resins are used at levels up to 10 weight percent of the epoxy crosslinked/acid grafted olefin copolymer composition on a solids basis.

This invention employs pigments for aesthetic and functional effects. Conductive carbon black, talc and other organic and inorganic pigments may be employed. The carbon black and talc pigments may each comprise approximately 25 weight percent of the epoxy crosslinked/acid grafted olefin copolymer.

The invention is described in further detail in the following examples.

Grafting of Copolymer with Maleic Anhydride

Example A

In a four-neck flask fitted with agitator, condenser and dropping funnel, 250 g of propylene/hexene-1 copolymer (propylene component 40 weight percent, hexene component 60 weight percent, number average molecular weight 55,000) was liquefied under heat. Then, keeping the temperature of system at 220° C., 20 g of maleic anhydride and 8 g of 5-di(t-butylperoxy) hexane in 20 g of methyl ethyl ketone (MEK) were added dropwise over one hour while agitating, and the reaction was conducted for one hour. After the reaction, MEK was removed by flow of nitrogen and the reaction product was cooled to room temperature. When measuring molecular weight by GPC it showed a number average molecular weight of 15,000. The amount of grafted maleic anhydride was 5.1%.

Example B

By a procedure similar to Example A, 20 g of maleic anhydride and 8 g of 5-di-(t-butyl peroxy) hexane were reacted with 250 g of propylene-butene copolymer (propylene component 45 weight percent, number average molecular weight 47,000) to obtain a graft copolymer in which the amount of grafted maleic anhydride was 6 percent. The number average molecular weight of the product was 8000).

Preparation of Aqueous Emulsion of Grafted Copolymer

Example C

In a flask equipped with agitator, condenser, and nitrogen sparger, 10 g of surfactant (Igepal CO-610 made by Rhone-Poulenc) were placed, mixed and heated to 110° C., and 50 g of the graft copolymer of Preparatory Example A was added slowly while agitating the mixture intensively. After the graft copolymer melted, the mixture was cooled to 100° C. After that 20 g of a 14% solution of ammonia at 90° C. was added.

Keeping the temperature at 100° C., water at 90° C. was added slowly while intense agitation continued. Upon the addition of 140 grams of water, the resulting milky white liquor was removed from the flask.

Examples D & E

Employing a procedure similar to that of Example C, resins of Examples A and B were dispersed into water according to the formulations shown in Table 1.

TABLE 1

| GRAFT Ex. COPOLYMER | SURFACTANTS | | | | AMINE | |
|---|---|---|---|---|---|---|
| C Example A | 50 | CO-610[1] | 10 | | Ammonia 28% | 10 |
| D Example A | 50 | Witflow 962[3] | 8 | Unithox 450[2] 2 | Ammonia 28% | 10 |
| E Example B | 80 | CO-610[1] | 12 | | Ammonia 28% | 10 |

[1]Rhone-Poulenc
[2]Petrolite Corp.
[3]Witco
Equivalent weight of emulsions of Examples C, D, and E ≈ 1100

In the formulations given in the following examples, except where noted otherwise, the epoxy resin is a cycloaliphatic di-epoxy resin having an equivalent weight of 135 and sold under the trademark CYRACURE UVR-6110 by Union Carbide. The catalyst is para-toluene sulfonic acid (PTSA). The thixotrope is sold under the trademark ACRYSOL by Union Carbide. The wetting agent is sold under the trademark SILWET by Union Carbide. The weight percent of all components marked with an asterisk is given in terms of solids present.

| Component | Concentration (Wt %) |
|---|---|
| CONTROL | |
| Aqueous Emulsion of Example C | 24.0 |
| Thixotrope* | 1.0 |
| Wetting Agent* | 0.2 |
| Water | 74.8 |
| | 100.0 |
| Example 1 | |
| Aqueous Emulsion of Example C | 24.0 |
| Epoxy resin* | 0.2 |
| Thixotrope* | 1.0 |
| Wetting Agent* | 0.2 |
| Water | 74.4 |
| PTSA* | 0.2 |
| | 100.0 |
| Example 2 | |
| Aqueous Emulsion of Example C | 24.0 |
| Epoxy resin* | 0.3 |
| Thixotrope* | 1.0 |
| Wetting Agent* | 0.2 |
| Water | 74.3 |
| PTSA* | 0.2 |
| | 100.0 |

| Component | Concentration (Wt %) |
|---|---|
| Example 3 | |
| Aqueous Emulsion of Example C | 24.0 |
| Epoxy resin* | 0.6 |
| Thixotrope* | 1.0 |
| Wetting Agent* | 0.2 |
| Water | 74.0 |
| PTSA* | 0.2 |
| | 100.0 |
| Example 4 | |
| Aqueous Emulsion of Example C | 24.0 |
| Epoxy resin* | 1.0 |
| Thixotrope* | 1.0 |
| Wetting Agent* | 0.2 |
| Water | 73.8 |
| | 100.0 |
| Example 5 | |
| Aqueous Emulsion of Example C | 24.0 |
| Epoxy resin* | 1.0 |
| Thixotrope* | 1.0 |
| Wetting Agent* | 0.2 |
| Water | 73.6 |
| PTSA* | 0.2 |
| | 100.0 |
| Example 6 | |
| Aqueous Emulsion of Example C | 24.0 |
| Epoxy resin* | 1.0 |
| Conductive Carbon Black | 1.0 |
| Talc | 0.7 |
| Water | 71.9 |

The dispersion was sand milled to achieve a Hegman grind of 7+. The following constituents were added to it.

| | |
|---|---|
| Thickener* | 1.0 |
| Wetting Agent* | 0.2 |
| PTSA* | 0.2 |
| | 100.0 |
| Example 7 | |
| Aqueous Emulsion of Example C | 24.0 |
| Bisphenol A epoxy resin* | 1.0 |
| Conductive Carbon Black | 1.0 |
| Talc | 0.7 |
| Water | 71.9 |
| The dispersion was sandmilled to achieve a Hegman grind of 7+. The following constituents were added to it. | |
| Thickener* | 1.0 |
| Wetting Agent* | 0.2 |
| Tertiary amine catalyst* | 0.2 |
| | 100.0 |
| Example 8 | |
| Aqueous Emulsion of Example C | 24.0 |
| Epoxy resin* | 1.0 |
| Polyurethane Emulsion*† | 2.0 |
| Thixotrope* | 1.0 |
| Wetting Agent* | 0.2 |
| Water | 71.6 |
| PTSA* | 0.2 |
| | 100.0 |
| Example 9 | |
| Aqueous Emulsion of Example D | 24.0 |
| Epoxy resin* | 1.0 |
| Acrylic Emulsion*†† | 2.0 |
| Thixotrope* | 1.0 |
| Wetting Agent* | 0.2 |
| Water | 71.6 |
| PTSA* | 0.2 |
| | 100.0 |
| Example 10 | |
| Aqueous Emulsion of Example D | 24.0 |
| Epoxy resin* | 1.0 |
| Thixotrope* | 1.0 |
| Wetting Agent* | 0.2 |
| Water | 71.6 |
| PTSA* | 0.2 |
| | 100.0 |
| Example 11 | |
| Aqueous Emulsion of Example E | 24.0 |
| Epoxy resin* | 1.0 |
| Thixotrope* | 1.0 |
| Wetting Agent* | 0.2 |
| Water | 71.6 |
| PTSA* | 0.2 |
| | 100.0 |
| Example 12 | |
| Aqueous Emulsion of Example E | 24.0 |
| Epoxy resin* | 2.0 |
| Thixotrope* | 1.0 |
| Wetting Agent* | 0.2 |
| Water | 70.6 |
| PTSA* | 0.2 |
| | 100.0 |

†Sold under the trademark CYDROTHANE by Cytec.
††Sold under the trademark NEOCRYL by Zeneca.

The formulations of the preceding examples are stated in terms of equivalents in Table 2.

TABLE 2

| Example | Maleated propylene-α-olefin Equivalents/Grams | Di-Epoxy Equivalents/ Grams | Equivalents Ratio maleated propylene-α-olefin: Epoxy |
|---|---|---|---|
| Control | 0.004/4 | 0/0 | 1:0 |
| 1 | 0.004/4 | 0.001/0.2 | 3:1 |
| 2 | 0.004/4 | 0.002/0.3 | 2:1 |
| 3 | 0.004/4 | 0.004/0.6 | 1:1 |
| 4 | 0.004/4 | 0.008/1.0 | 1:2 |
| 5 | 0.004/4 | 0.008/1.0 | 1:2 |
| 6 | 0.004/4 | 0.008/1.0 | 1:2 |
| 7 | 0.004/4 | 0.008/1.0 | 1:2 |
| 8 | 0.004/4 | 0.008/1.0 | 1:2 |
| 9 | 0.004/4 | 0.008/1.0 | 1:2 |
| 10 | 0.004/4 | 0.008/1.0 | 1:2 |
| 11 | 0.004/4 | 0.008/1.0 | 1:2 |
| 12 | 0.004/4 | 0.016/2.0 | 1:4 |

The components of the preceding examples were thoroughly mixed and applied by handspraying at approximately 60 psi onto a TPO substrate to build a film from 0.3 to 0.5 mil. The coated substrate was baked at approximately 120° C. (248° F.) for approximately 10 minutes. After the baking cycle, the coated part was cooled to room temperature. The cooled substrates coated with the products of the examples, except for Example 7, were painted with a melamine curing, thermosetting solvent-based basecoat and clearcoat paint. The cooled substrate coated with the product of Example 7 was painted with an isocyanate curing, thermosetting solvent-based basecoat and clearcoat paint. The painted parts were air dried for approximately 10 minutes and the melamine curing paints were baked at 120° C./30 minutes and the isocyanate curing paints were baked at 82° C./30 minutes. All cooled painted substrates were tested for adhesion following the procedures described below. The results are listed in Table 3.

Adhesion and degree of crosslinking of the coating of this invention were determined by performing cross-hatch adhesion testing and observing the degree of tackiness of the film. The adhesion testing consisted of cutting the coated surface with a fine cutter to form one hundred crosscuts at intervals of 1 mm each. By closely contacting the cross-hatched surface with cellophane tape and peeling off at an angle of 180°, the number of remaining crosscuts were counted. The adhesion and degree of tackiness results are listed in Table 3.

The parts painted as described above were tested for gasoline resistance by immersing the 'X' scribed painted substrates for 1 hour in a synthetic gasoline mixture consisting of 45 wt % toluene and 55 weight percent VM & P naphtha. Loss of paint adhesion was determined visually. Results are shown in Table 3.

The parts painted as described above were tested for 100% relative humidity resistance at 100° F. (38° C.). Tested parts were evaluated after 240 hours using the adhesion test discussed above. Humidity resistance results are listed in Table 3.

invention be limited to the specific embodiments that have been illustrated and described. Rather, it is intended that the scope to the invention be determined by the scope of the appended claims.

The subject matter claimed is:

1. An article having a polyolefin resin surface which is coated with an aqueous composition comprising:
   (a) a halogen-free copolymer of a higher α-olefin and at least one monomer selected from the group consisting of ethylene and propylene, said copolymer having an α,β-unsaturated dicarboxylic acid or anhydride grafted thereon;
   (b) a neutralizing base; and
   (c) a water-dispersible resin containing at least two epoxy groups.

2. The article of claim 1 wherein the polyolefin resin on the surface is selected from the group consisting of polypropylene and thermoplastic olefin.

3. The article of claim 1 wherein the selected monomer is propylene.

4. The article of claim 3 wherein the propylene component of (a) before grafting is at least about 20% by weight of the total copolymer.

5. The article of claim 1 wherein the grafted copolymer of (a) contains from about 1 to about 20% by weight of the dicarboxylic acid or anhydride.

TABLE 3

| FORMULATION | ADHESION 10 min 120° C. | PAINTED ADHESION | PAINTED GAS RESISTANCE 1 HOUR IMMERSION | PAINTED HUMIDITY RESISTANCE 240 HOURS | CURE 10 min./120° C. |
|---|---|---|---|---|---|
| Control | 10 | 10 | 10 | 0 (No adhesion) | tacky |
| 1 | 10 | 10 | 10 | 5 (Slight adhesion) | tacky |
| 2 | 10 | 10 | 10 | 10 | sl. tacky |
| 3 | 10 | 10 | 10 | 10 | sl. tacky |
| 4 | 10 | 10 | 10 | 10 | tacky |
| 5 | 10 | 10 | 10 | 10 | sl. tacky |
| 6 | 10 | 10 | 10 | 10 | sl. tacky |
| 7 | 10 | 10 | 10 | 10 | not tacky |
| 8 | 10 | 10 | 10 | 10 | not tacky |
| 9 | 10 | 10 | 8 | 10 | not tacky |
| 10 | 10 | 10 | 10 | 10 | sl. tacky |
| 11 | 10 | 10 | 8 | 0 (No adhesion) | sl. tacky |
| 12 | 10 | 10 | 8 | 10 | sl. tacky |

Rating: 0 = Poor 10 = Excellent

Thus, in accordance with the invention, there has been provided a non-halogenated thermoset adhesion promoting coating for polypropylene-based substrates.

There also has been provided a zero VOC coating composition containing a non-halogenated resin which promotes adhesion of a subsequent coating to a polypropylene-based substrate.

There also has been provided a coating which promotes adhesion of a subsequent coating to polypropylene-based surfaces of automotive parts which may be exposed to high humidity and may be subjected to repeated contact with gasoline.

There also has been provided an article having a polypropylene-based surface which is coated with an aqueous, zero VOC coating composition containing a non-halogenated resin which, when dry, promotes adhesion of a subsequent coating to the polypropylene-based surface.

With this description of the invention in detail, those skilled in the art will appreciate that modification may be made to the invention without departing from the spirit thereof. Therefore, it is not intended that the scope of the 6. The article of claim 1 wherein the dicarboxylic anhydride is maleic anhydride.

7. The article of claim 1 wherein the number average molecular weight of the grafted copolymer is from about 3000 to about 55,000.

8. The article of claim 3 wherein the grafted copolymer of (a) contains from about 1 to about 20% by weight of maleic anhydride.

9. A polyolefin resin article having an adhesion promoting coating on its surface which is formed by spraying the surface with an aqueous composition comprising:
   (a) a halogen-free copolymer of a higher α-olefin and at least one monomer selected from the group consisting of ethylene and propylene, said copolymer having an α,β-unsaturated dicarboxylic acid or anhydride grafted thereon;
   (b) a neutralizing base; and
   (c) a water-dispersible resin containing at least two epoxy groups, and curing the article at a temperature of from about 25° to about 150° C.

10. The article of claim 9 wherein the selected monomer is propylene.

11. The article of claim 10 wherein the propylene component of the copolymer of (a) before grafting is at least about 20% by weight of the total copolymer.

12. The article of claim 9 wherein the grafted copolymer of (a) contains from about 1 to about 20% by weight of the dicarboxylic acid or anhydride.

13. The article of claim 9 wherein the dicarboxylic anhydride is maleic anhydride.

14. The article of claim 9 wherein the number average molecular weight of the grafted copolymer is from about 3000 to about 55,000.

15. The article of claim 12 wherein the grafted copolymer of (a) contains from about 1 to about 20% by weight of maleic anhydride.

16. The article of claim 12 wherein the α-olefin component of the copolymer of (a) is hexene-1.

17. The article of claim 16 wherein the amount of hexene-1 is from about 10 to about 80% by weight of the total copolymer before grafting.

18. The article of claim 17 wherein the amount of hexene-1 is about 60% by weight of the total copolymer before grafting.

* * * * *